(12) United States Patent
Wang et al.

(10) Patent No.: US 12,483,128 B2
(45) Date of Patent: Nov. 25, 2025

(54) THREE-LEVEL BOOST CONVERTER AND CONTROL METHOD

(71) Applicant: Huawei Digital Power Technologies Co., Ltd., Shenzhen (CN)

(72) Inventors: Jun Wang, Shanghai (CN); Lei Shi, Shanghai (CN); Yunfeng Liu, Shanghai (CN); Zhaohui Wang, Nuremberg (DE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 423 days.

(21) Appl. No.: 18/156,554

(22) Filed: Jan. 19, 2023

(65) Prior Publication Data
US 2023/0155499 A1    May 18, 2023

Related U.S. Application Data

(63) Continuation of application No. PCT/CN2021/081970, filed on Mar. 22, 2021.

(30) Foreign Application Priority Data

Jul. 22, 2020    (CN) .......................... 202010713160.6

(51) Int. Cl.
*H02M 3/156*    (2006.01)
*H02M 1/00*    (2006.01)
(Continued)

(52) U.S. Cl.
CPC .......... *H02M 3/156* (2013.01); *H02M 1/0095* (2021.05); *H02M 1/08* (2013.01); *H02M 1/14* (2013.01)

(58) Field of Classification Search
CPC ...... H02M 3/156; H02M 1/08; H02M 1/0095; H02M 1/14; H02M 3/07; H02M 1/32; H02M 1/36; Y02B 70/10
See application file for complete search history.

(56) References Cited

U.S. PATENT DOCUMENTS

6,275,018 B1 *    8/2001    Telefus ................. H02M 3/156
                                                              363/16
8,901,905 B2 *    12/2014    Fayed ................... H02M 3/158
                                                              375/132
(Continued)

FOREIGN PATENT DOCUMENTS

CN        204465340 U    *    7/2015
CN        108258899 A    *    7/2018    .............. H02M 1/32
(Continued)

OTHER PUBLICATIONS

Machine Translation CN_108258899_ (Year: 2018).*
Machine Translation of CN-204465340-U (Year: 2015).*

*Primary Examiner* — Thienvu V Tran
*Assistant Examiner* — Yahveh Comas Torres
(74) *Attorney, Agent, or Firm* — Maier & Maier, PLLC

(57) ABSTRACT

A three-level boost converter and a control method. The three level flying-capacitor boost converter includes: an inductor, a flying capacitor, a controller, a first switching transistor and a second switching transistor as primary power transistors. When a voltage of the flying capacitor is less than or equal to a half of a bus voltage, a first driving signal is sent to the first switching transistor, and a second driving signal is sent to the second switching transistor; or when a voltage of the flying capacitor is greater than a half of a bus voltage, a first driving signal is sent to the second switching transistor, and a second driving signal is sent to the first switching transistor. The bus voltage is an output voltage Vo of the three-level boost converter.

20 Claims, 8 Drawing Sheets

(51) Int. Cl.
*H02M 1/08* (2006.01)
*H02M 1/14* (2006.01)

(56) References Cited

U.S. PATENT DOCUMENTS

| | | | |
|---|---|---|---|
| 9,941,794 B2* | 4/2018 | Knobloch | H02J 3/381 |
| 10,547,241 B1* | 1/2020 | Li | H02M 3/1588 |
| 11,283,354 B2* | 3/2022 | Zhuang | H02M 7/4837 |
| 2011/0095740 A1* | 4/2011 | Mori | H02M 3/156 |
| | | | 323/282 |
| 2012/0212197 A1* | 8/2012 | Fayed | H02M 3/156 |
| | | | 323/271 |
| 2015/0244269 A1* | 8/2015 | Yu | H02M 3/156 |
| | | | 323/284 |
| 2018/0034364 A1* | 2/2018 | Nakada | H02M 3/07 |
| 2019/0214904 A1* | 7/2019 | Yu | H02M 7/4837 |
| 2020/0328674 A1 | 10/2020 | Yu et al. | |
| 2020/0358356 A1* | 11/2020 | Shi | H02M 3/158 |

FOREIGN PATENT DOCUMENTS

| | | |
|---|---|---|
| CN | 106685225 B | 4/2019 |
| WO | 2018045936 A1 | 3/2018 |

\* cited by examiner

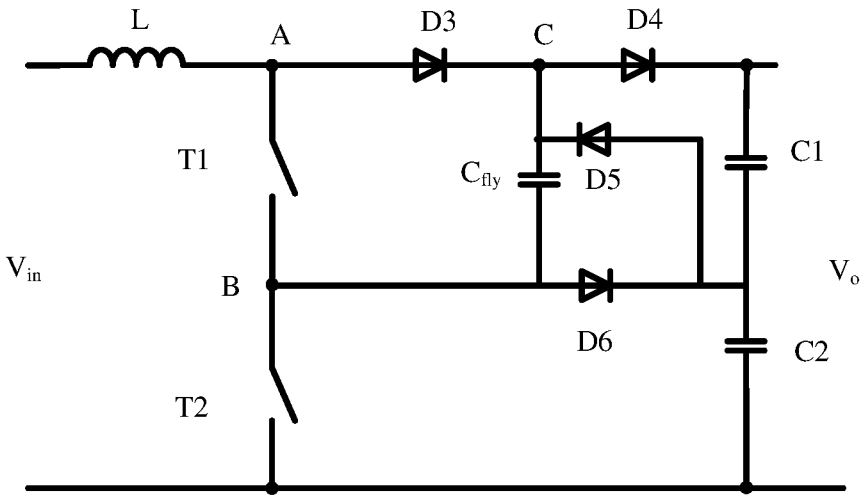

FIG. 9

| When a voltage of a flying capacitor is less than or equal to a half of a bus voltage, send a first driving signal to a first switching transistor, and send a second driving signal to a second switching transistor, where the second driving signal has N pulses in each period of the first driving signal, and an inductor has N+1 charge and discharge periods in each period of the first driving signal | ← 1001 |

↓

| When the voltage of the flying capacitor is greater than the half of the bus voltage, send a first driving signal to the second switching transistor, and send a second driving signal to the first switching transistor | ← 1002 |

FIG. 10

THREE-LEVEL BOOST CONVERTER AND CONTROL METHOD

CROSS-REFERENCE TO RELATED APPLICATIONS

This application a continuation of International Application No. PCT/CN2021/081970, filed on Mar. 22, 2021, which claims priority to Chinese Patent Application No. 202010713160.6, filed on Jul. 22, 2020. The disclosures of the aforementioned applications are hereby incorporated by reference in their entireties.

TECHNICAL FIELD

The embodiments relate to the field of power electronics technologies, a three-level boost converter, and a control method.

BACKGROUND

A boost converter is a boost power converter circuit that steps up an input voltage and then outputs an increased voltage, thereby implementing power conversion. Boost converters are classified into two-level boost converters and three-level boost converters. The two-level boost converter is generally applied to a scenario with a low voltage level, and the two-level boost converter corresponds to two input levels. The three-level boost converter is applied to a scenario with a higher voltage level. The three-level boost converter can realize power conversion of three or more input levels.

Compared with the two-level boost converter, the three-level boost converter implements three levels by improving a topology structure of the three-level boost converter, and then implements a high-voltage and high-power output. With a same input voltage, the three-level boost converter has a distinct advantage that a voltage stress of a power component can be reduced to a half of a voltage stress of the two-level boost converter, so that a high-voltage output can be achieved through the power component with a low withstand voltage.

Most of the current three-level boost converters include flying capacitors. A volume and a cost of a three level flying-capacitor boost converter are limited by an inductor inside the boost converter. Because the inductor has a large volume, the three-level boost converter has a large size, causing a high cost.

SUMMARY

The embodiments may provide a three-level boost converter and a control method to reduce a volume of an inductor and therefore reduce a volume of the three-level boost converter.

According to a first aspect, an embodiment may provide a three-level boost converter. The converter is a typical three level flying-capacitor boost, and includes a first switching transistor, a second switching transistor, an inductor, a flying capacitor, and a controller, where the first switching transistor and the second switching transistor are primary power transistors. The controller sends asymmetric driving signals to the first switching transistor and the second switching transistor, to increase a charge and discharge frequency of the inductor and further reduce a ripple current of the inductor. When a voltage of the flying capacitor is less than or equal to a half of a bus voltage, the controller may send a first driving signal to the first switching transistor and may send a second driving signal to the second switching transistor; or when a voltage of the flying capacitor is greater than a half of a bus voltage, the controller may send a first driving signal to the second switching transistor, and may send a second driving signal to the first switching transistor. The bus voltage is an output voltage of the three-level boost converter. The second driving signal has N pulses in each period of the first driving signal, the inductor has N+1 charge and discharge periods in each period of the first driving signal, and N is an integer greater than or equal to 2. In this way, the charge and discharge frequency of the inductor is increased.

Because the charge and discharge frequency of the inductor is increased, the ripple current of the inductor can further be reduced. After the ripple current is reduced, an inductor with a smaller inductance can be used, which has a smaller volume and a lower cost. Therefore, the embodiment can reduce a size and a cost of the converter.

The converter may further include a third switching transistor and a fourth switching transistor. A first terminal of the inductor is connected to a first input of the three-level boost converter, and a second terminal of the inductor is connected to a first node. A first terminal of the first switching transistor is connected to the first node, and a second terminal of the first switching transistor is connected to a second node. A first terminal of the second switching transistor is connected to the second node, and a second terminal of the second switching transistor is connected to a second input of the three-level boost converter. An anode and a cathode of the third switching transistor are respectively connected to the first node and a third node, and an anode and a cathode of the fourth switching transistor are respectively connected to the third node and a first output of the three-level boost converter. A first terminal of the flying capacitor is connected to the second node, and a second terminal of the flying capacitor is connected to the third node. The controller sending the asymmetric driving signals to the first switching transistor and the second switching transistor can still increase the charge and discharge frequency of the inductor and further reduce the ripple current of the inductor.

To increase the charge and discharge frequency of the inductor, the second driving signal may have N pulses in a low-level time period of each period of the first driving signal, so that the inductor has N+1 charge and discharge periods existing in one period of the first driving signal. In other words, the inductor completes N+1 times of charging and discharging in one period of the first driving signal.

To configure asymmetric driving signals for the first switching transistor and the second switching transistor, frequencies corresponding to at least two pulses of the N pulses of the second driving signal may be made different.

A pulse of the second driving signal may have the following several implementations.

Frequencies corresponding to all the N pulses of the second driving signal may be made different.

The N pulses may have a same pulse width.

N may be 2.

N may be greater than or equal to 3.

Frequencies of the first N−1 pulses of the N pulses may be the same and a frequency of the last pulse of the N pulses may be less than the frequency of the first N−1 pulses, so that a first driving signal and a second driving signal that are asymmetric can be formed. Then the asymmetric driving signals are sent to the first switching transistor and the second switching transistor. This increases the charge and discharge frequency of the inductor and reduces the ripple current of the inductor.

In each period of the first driving signal, a rising edge of the first pulse of the N pulses may follow a falling edge of the first driving signal.

Because the ripple current of the inductor is affected by a time lag between the first pulse of the N pulses and the first driving signal, the controller may determine the time lag through the ripple current of the inductor. To further reduce the ripple current of the inductor and keep the ripple current of the inductor at a low value, the controller controls a charge current of the inductor to be equal to a discharge current of the inductor in each charge and discharge period of the inductor, so as to determine the time lag.

The controller may be further configured to determine the time lag based on an input voltage and the output voltage of the three-level boost converter, a voltage of the flying capacitor, and the period of the first driving signal.

The controller may be configured to obtain the time lag, which is $(D_1+D_2)T_{sw}$, according to the following formula:

$$(V_{in}+V_c-V_o)D_1T_{sw}=(V_o-V_{in})D_2T_{sw}$$

where $V_{in}$ is the input voltage of the three-level boost converter, $V_o$ is the output voltage of the three-level boost converter, $V_c$ is the voltage of the flying capacitor, $T_{sw}$ is the period of the first driving signal, $D_1$ is a duty cycle of the three-level boost converter, and $D_2 T_{sw}$ is a delay time between the rising edge of the first pulse of the N pulses and the falling edge of the first driving signal.

To further reduce a loss generated in a circuit, in each period of the first driving signal, the time lag between the first pulse of the N pulses and the first driving signal may be determined based on a loss of the first switching transistor and/or a loss of the second switching transistor.

to reduce both the ripple current of the inductor and the loss generated in the circuit, the time lag may be determined using a combination of the two manners of determining the time lag described above. In each period of the first driving signal, the time lag between the first pulse of the N pulses and the first driving signal may be determined based on the ripple current of the inductor and a loss of at least one switching transistor.

Another three level flying-capacitor boost may further include a fifth switching transistor. A first terminal of the fifth switching transistor is connected to the second node, and a second terminal of the fifth switching transistor is connected to the first terminal of the flying capacitor. The fifth switching transistor included in the converter can protect the second switching transistor. When a power supply is turned on, the fifth switching transistor is first controlled to be switched off. In this case, a voltage of the power supply is not applied on the second switching transistor. This reduces a voltage applied on the second switching transistor at a moment when the second switching transistor is switched on.

Another three level flying-capacitor boost may further include a third diode and a fourth diode. An anode of the third diode is connected to a midpoint of the output voltage of the three-level boost converter, and a cathode of the third diode is connected to the third node. An anode of the fourth diode is connected to the second node, and a cathode of the fourth diode is connected to the midpoint of the output voltage. In a topology structure of the converter, a voltage of two terminals of the second switching transistor can also be reduced at a moment when the power supply is turned on, and a voltage stress withstood by the second switching transistor is further reduced, thereby protecting the second switching transistor.

According to a second aspect, an embodiment may provide a control method for a three-level boost converter. The three-level boost converter includes a first switching transistor, a second switching transistor, an inductor, a flying capacitor, and a controller, where the first switching transistor and the second switching transistor are primary power transistors.

The Method Includes:

when a voltage of the flying capacitor is less than or equal to a half of a bus voltage, sending a first driving signal to the first switching transistor, and sending a second driving signal to the second switching transistor; or when a voltage of the flying capacitor is greater than a half of a bus voltage, sending a first driving signal to the second switching transistor, and sending a second driving signal to the first switching transistor.

The bus voltage is an output voltage of the three-level boost converter.

The second driving signal has N pulses in each period of the first driving signal, the inductor has N+1 charge and discharge periods in each period of the first driving signal, and N is an integer greater than or equal to 2.

The second driving signal may have N pulses in a low-level time period of each period of the first driving signal.

Frequencies corresponding to at least two pulses of the N pulses may be different.

The embodiments may have at least the following advantages:

The embodiments may provide a three-level boost converter, including a first switching transistor, a second switching transistor, an inductor, a flying capacitor, and a controller, where the first switching transistor and the second switching transistor are primary power transistors. A volume and a cost of the three-level boost converter are limited by a volume and a cost of the inductor. A ripple current of the inductor needs to be reduced to reduce the volume of the inductor. Because a higher frequency indicates a smaller ripple current, the controller reduces the ripple current of the inductor by increasing a charge and discharge frequency of the inductor, and further reduces an inductance of the inductor. A smaller inductance of the inductor indicates a smaller volume of the inductor. Therefore, the volume of the three-level boost converter that includes the inductor is also reduced.

The controller may send asymmetric driving signals to the first switching transistor and the second switching transistor, and the two driving signals have different frequencies. When a voltage of the flying capacitor is less than or equal to a half of a bus voltage, the controller sends a first driving signal to the first switching transistor, sends a second driving signal to the second switching transistor, and controls the second driving signal to have N pulses in each period of the first driving signal and control the inductor to have N+1 charge and discharge periods in each period of the first driving signal, where N is an integer greater than or equal to 2.

Through the foregoing driving manner, the inductor has at least three charge and discharge periods in each period of the first driving signal. This increases the charge and discharge frequency of the inductor and further reduces the ripple current of the inductor. Similarly, when the voltage of the flying capacitor is greater than the half of the bus voltage, the controller sends a first driving signal to the second switching transistor, and sends a second driving signal to the first switching transistor. This also increases the charge and discharge frequency of the inductor and reduces the ripple current of the inductor. A smaller ripple current indicates a smaller inductance required for the inductor, and the inductor with a smaller inductance has a smaller volume. Therefore, the volume of the three-level boost converter is reduced, and the size and cost of the three-level boost converter are reduced.

BRIEF DESCRIPTION OF THE DRAWINGS

FIG. 9 is still another topology diagram of a three-level boost converter according to an embodiment; and FIG. 10 is a flowchart of a control method for a three-level boost converter according to an embodiment.

DETAILED DESCRIPTION OF THE EMBODIMENTS

To make a person skilled in the art better understand the embodiments, an operating principle of a three-level boost converter is first described below.

For ease of description, the three-level boost converter is referred to as a converter below.

Embodiment 1 of Converter

A controller in the converter provided in this embodiment may send asymmetric driving signals to a first switching transistor and a second switching transistor, to increase a charge and discharge frequency of an inductor and further reduce a ripple current of the inductor. After the ripple current is reduced, an inductor with a smaller inductance can be used, which has a smaller volume and a lower cost. Therefore, the embodiment can reduce a size and a cost of the converter.

Figure 1:
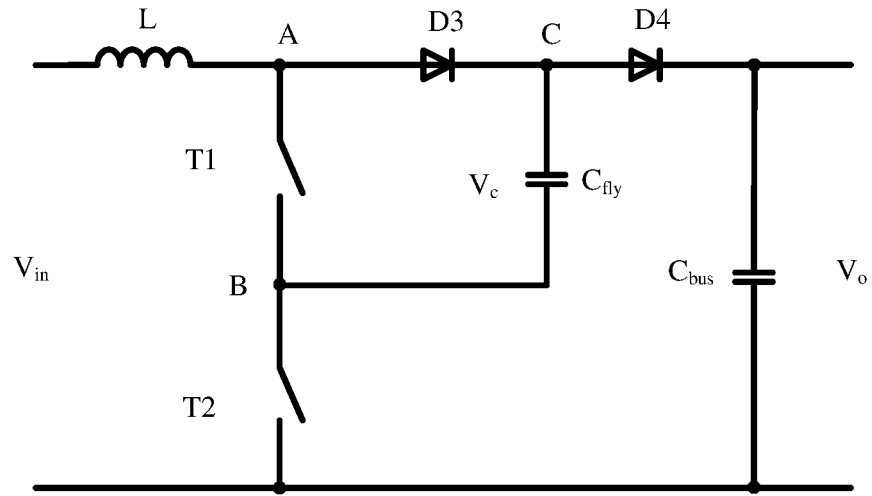
FIG. 1 is a topology diagram of a three-level boost converter according to an embodiment.

FIG. 1 is a topology diagram of a three-level boost converter according to an embodiment.

The converter includes a first switching transistor T1, a second switching transistor T2, an inductor L, a flying capacitor $C_{fly}$, a first diode D3, a second diode D4, and a controller (which is not shown in the figure).

A first terminal of the inductor L is connected to a first input of the converter, and a second terminal of the inductor L is connected to a first node A.

A first terminal of the first switching transistor T1 is connected to the first node A, and a second terminal of the first switching transistor T1 is connected to a second node B.

A first terminal of the second switching transistor T2 is connected to the second node B, and a second terminal of the second switching transistor T2 is connected to a second input of the converter.

An anode of the first diode D3 is connected to the first node A, and a cathode of the first diode D3 is connected to a third node C.

An anode of the second diode D4 is connected to the third node C, and a cathode of the second diode D4 is connected to a first output of the converter.

The first switching transistor T1 and the second switching transistor T2 are primary power transistors.

A first terminal of the flying capacitor $C_{fly}$ is connected to the second node B, and a second terminal of the flying capacitor $C_{fly}$ is connected to the third node C.

$V_{in}$ is an input voltage, $V_o$ is a bus voltage on a circuit output side of the converter, that is, an output voltage, and $C_{bus}$, is a bus capacitance on the circuit output side of the converter.

In addition, D3 and D4 in the figure may be replaced with switching transistors, that is, respectively replaced with a third switching transistor and a fourth switching transistor, provided that both the third switching transistor and the fourth switching transistor are controlled to implement operating modes of the diodes. In other words, the third switching transistor and the fourth switching transistor may be of the same type as the first switching transistor and the second switching transistor.

Driving signals sent by the controller to the first switching transistor T1 and the second switching transistor T2 are different for different magnitude relationships between a voltage $V_c$ of the flying capacitor and a half of the bus voltage $V_o$, that is, different magnitude relationships between $V_c$ and $0.5 V_o$. However, in both cases, a charge and discharge frequency of the inductor L can be increased and a ripple current of the inductor L can be reduced.

For ease of understanding, both cases are described in detail below.

In a First Case:

when $V_c$ is less than or equal to $0.5 V_o$, the controller sends a first driving signal to the first switching transistor T1, and sends a second driving signal to the second switching transistor T2.

The second driving signal has N pulses in each period of the first driving signal, the inductor L has N+1 charge and discharge periods in each period of the first driving signal, and N is an integer greater than or equal to 2.

Therefore, the inductor L has at least three charge and discharge periods in each period of the first driving signal. Further, the controller increases a charge and discharge frequency of the inductor L in each period of the first driving signal.

For example, when N is equal to 2, the inductor L has three charge and discharge periods in each period of the first driving signal. When N is equal to 3, the inductor L has four charge and discharge periods in each period of the first driving signal.

A value of N is not limited and N is an integer greater than or equal to 2. For example, N may be 2 or 3, or may be an integer with a larger value. For ease of description, an example that N is equal to 2 is used below for detailed description.

Figure 2:
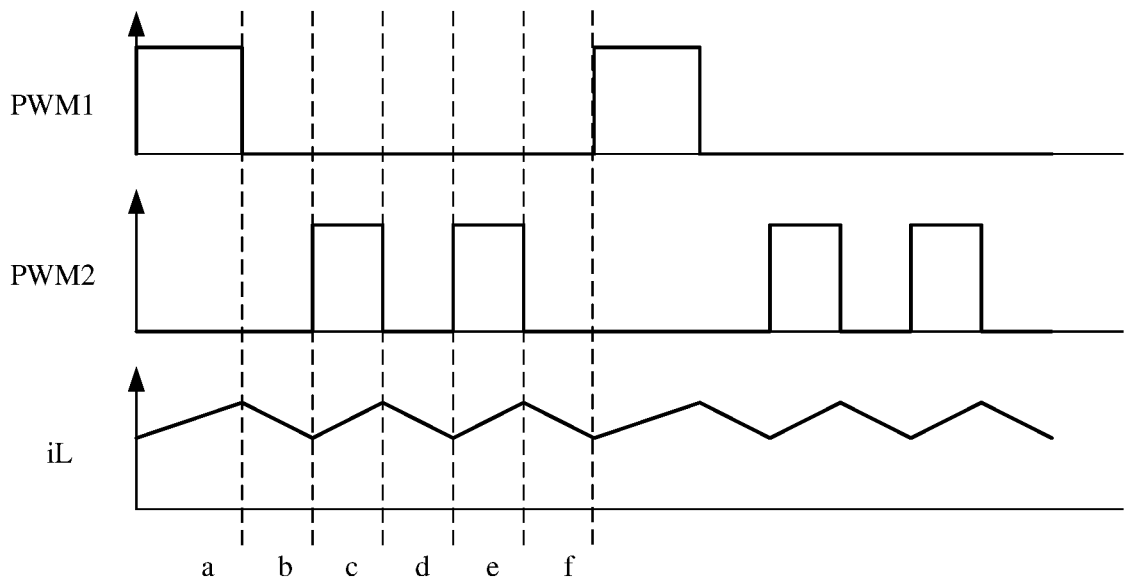
FIG. 2 is a waveform graph of driving signals according to an embodiment.

FIG. 2 is a waveform graph of driving signals according to an embodiment.

PWM1 represents the first driving signal, PWM2 represents the second driving signal, and iL represents a current of the inductor.

The controller sends PWM1 to the first switching transistor. Therefore, the controller can control an on/off state of the first switching transistor by using PWM1.

Similarly, the controller can also control an on/off state of the second switching transistor by using PWM2.

When PWM1 is at a high level, the first switching transistor is switched on, and when PWM1 is at a low level, the first switching transistor is switched off.

When PWM2 is at a high level, the second switching transistor is switched on, and when PWM2 is at a low level, the second switching transistor is switched off.

Periods of PWM1 and PWM2 are different. In the figure, periods (a+b+c+d+e+f) are a period of PWM1.

PWM2 may have a plurality of periods in each period of PWM1 and PWM2 may have two pulses in a low-level time period in each period of PWM1. Therefore, the inductor has three charge and discharge periods in one period of PWM1, that is, the inductor completes three times of charging and discharging in one period of PWM1. In other words, a charge and discharge frequency of the inductor is increased.

Using one period of PWM1 as an example, time period a is a high-level time period of PWM1, and time period b, time period c, time period d, time period e, and time period f are all low-level time periods of PWM1.

PWM2 has pulses in time periods c and e, that is, PWM2 is at a high level in time periods c and e. PWM2 has no pulse in time periods a, b, d, and f, that is, PWM2 is at a low level in time periods a, b, d, and f.

PWM2 has two pulses, that is, a pulse corresponding to time period c and a pulse corresponding to time period e, in the low-level time periods of one period of PWM1. Therefore, the inductor completes one time of charging and discharging in time period a and time period b, completes another time of charging and discharging in time period c and time period d, and completes another time of charging and discharging in time period e and time period f. In this way, the charge and discharge frequency of the inductor in one period of PWM1 is increased. Because the charge and discharge frequency of the inductor is increased, the ripple current of the inductor is reduced.

For ease of understanding by a person skilled in the art, the following describes in detail, with reference to FIG. 1, a process in which the controller controls PWM2 to have two pulses in a low-level time period of each period of PWM1 to increase a quantity of charging and discharging times of the inductor, that is, increase the charge and discharge frequency of the inductor.

For ease of description, a charge and discharge process of the inductor is described below by using one period of PWM1 as an example.

Within time period time a, PWM1 is at a high level, and PWM2 is at a low level, that is, the controller controls T1 to be switched on, controls T2 to be switched off, and controls L to charge, so that iL gradually increases; and within time period b, both PWM1 and PWM2 are at a low level, that is, the controller controls T1 to be switched off, controls T2 to be switched off, and controls L to discharge, so that iL gradually decreases. In this case, L completes one time of charging and discharging.

Within time period time c, PWM1 is at a low level, and PWM2 is at a high level, that is, the controller controls T1 to be switched off, controls T2 to be switched on, and controls L to charge, so that iL gradually increases; and within time period d, both PWM1 and PWM2 are at a low level, that is, the controller controls T1 to be switched off, controls T2 to be switched off, and controls L to discharge, so that iL gradually decreases. In this case, L completes another time of charging and discharging.

Similarly, L completes another time of charging and discharging in time period e and time period f. Therefore, L completes a total of three times of charging and discharging in one period of PWM1.

The controller sends the asymmetric PWM1 and PWM2 to T1 and T2, to increase the quantity of charging and discharging times of L in each period of PWM1, that is, increase the charge and discharge frequency of L, and therefore reduce the ripple current of L. Therefore, because the ripple current is reduced, an inductor with a small inductance can be used in the converter provided in this embodiment, where the inductor with a small inductance has a small volume and a low cost. Therefore, a volume and a cost of the converter can be reduced.

In a Second Case:

when $V_c$ is greater than 0.5 $V_o$, the controller sends a second driving signal to the first switching transistor T1 and sends a first driving signal to the second switching transistor T2.

Similarly, the controller can also increase the charge and discharge frequency of the inductor in each period of PWM1. Compared to the first case in which L performs at least two times of charging and discharging when T1 is in an off state, in the second case, L performs at least two times of charging and discharging when T2 is in an off state.

Therefore, the controller may further send asymmetric driving signals to T1 and T2 based on a magnitude relationship between $V_c$ and 0.5 $V_o$, to increase the charge and discharge frequency of the inductor. In both the first case and the second case, the controller can send asymmetric driving signals to T1 and T2, to increase the charge and discharge frequency of the inductor, and further reduce the ripple current of the inductor, so that an inductor with a small inductance can be selected.

Figure 3:
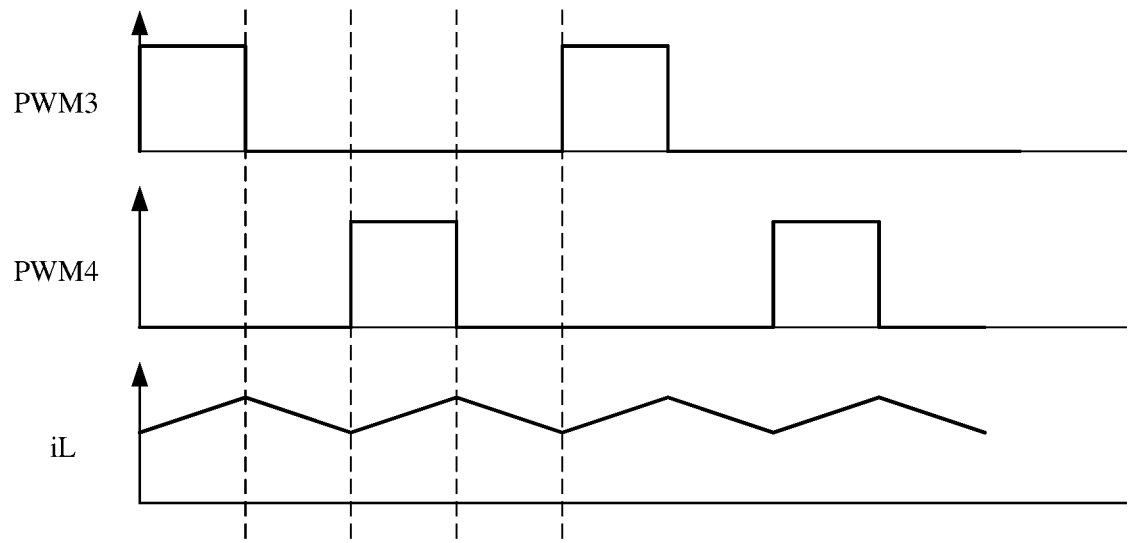
FIG. 3 is a waveform graph of symmetrical driving signals.

The following analyzes advantages of the waveform graph provided in FIG. 2 over a waveform graph provided in FIG. 3 with reference to the waveform graph of symmetric driving signals provided in FIG. 3.

FIG. 3 is a waveform graph of symmetrical driving signals.

PWM3 and PWM4 in FIG. 3 are symmetrical, that is, the two driving signals have a same period and a same duty cycle.

PWM3 represents the first driving signal, PWM4 represents the second driving signal, and iL represents the current of the inductor.

As shown in FIG. 3, in one period of PWM3, PWM3 has one pulse, PWM4 has one pulse, the inductor performs two times of charging and discharging, and iL has two periods, iL may rise at a high level of PWM3 and may fall at a low level of PWM3, and iL may rise at a high level of PWM4 and may fall at a low level of PWM4.

However, in FIG. 2, PWM1 and PWM2 are asymmetric driving signals. In one period of PWM1, PWM1 has one pulse, PWM2 has at least two pulses, and the inductor performs at least three times of charging and discharging.

By comparison between FIG. 2 and FIG. 3, the driving signals provided in the embodiment are asymmetric and a frequency of one of the driving signals is increased, thereby increasing the charge and discharge frequency of the inductor and reducing the ripple current of the inductor.

The foregoing describes the process in which the controller sends the asymmetric driving signals to the first switching transistor and the second switching transistor to increase the charge and discharge frequency of the inductor. The following describes in detail several implementation forms of the driving signal.

Embodiment 2 of Converter

The embodiments may not limit a quantity of pulses of a second driving signal in a low-level time period of each period of a first driving signal. In other words, N may be 2 or more than 2, for example, 3 or 4.

Because the first driving signal is simple, an implementation of the corresponding second driving signal in one period of the first driving signal is described below. A pulse width of each of N pulses of the second driving signal is not limited. The pulse widths may be the same or may be different.

For ease of understanding by a person skilled in the art, the following provides detailed descriptions in three cases.

In a first case, frequencies corresponding to at least two pulses of the N pulses are different.

For ease of understanding, the following provides descriptions by using an example in which the second driving signal has three pulses in a low-level time period of each period of the first driving signal. In other words, when N=3, frequencies corresponding to two pulses of the three pulses are different.

Figure 4A:
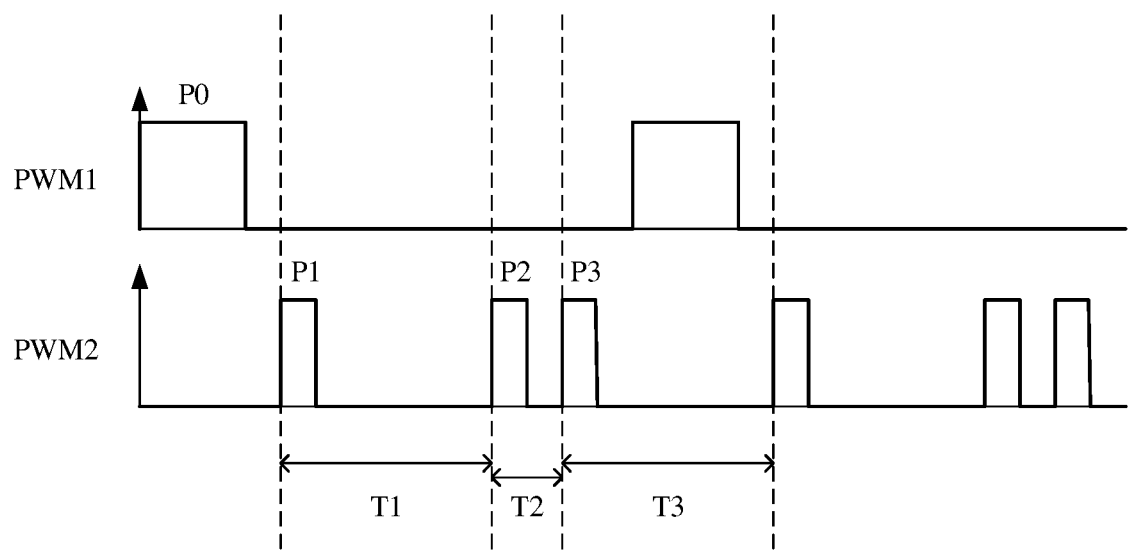
FIG. 4A is another waveform graph of driving signals according to an embodiment.

FIG. 4A is another waveform graph of driving signals according to an embodiment.

P1, P2, and P3 represent three pulses of the second driving signal existing in a low-level time period in one period of the first driving signal.

T1 is a period corresponding to P1, T2 is a period corresponding to P2, and T3 is a period corresponding to P3.

Period T1 corresponding to P1 may be the same as period T3 corresponding to P3, that is, T1=T3, and therefore, a frequency corresponding to P1 may be equal to a frequency corresponding to P3. However, the periods of P1 and P3 are different from period T2 corresponding to P2, and therefore, the frequencies of P1 and P3 are different from a frequency corresponding to P2. T3 may be greater than T2.

P0 represents a pulse of the first driving signal in one period, and pulse widths of P1, P2, and P3 are the same.

Figure 4B:
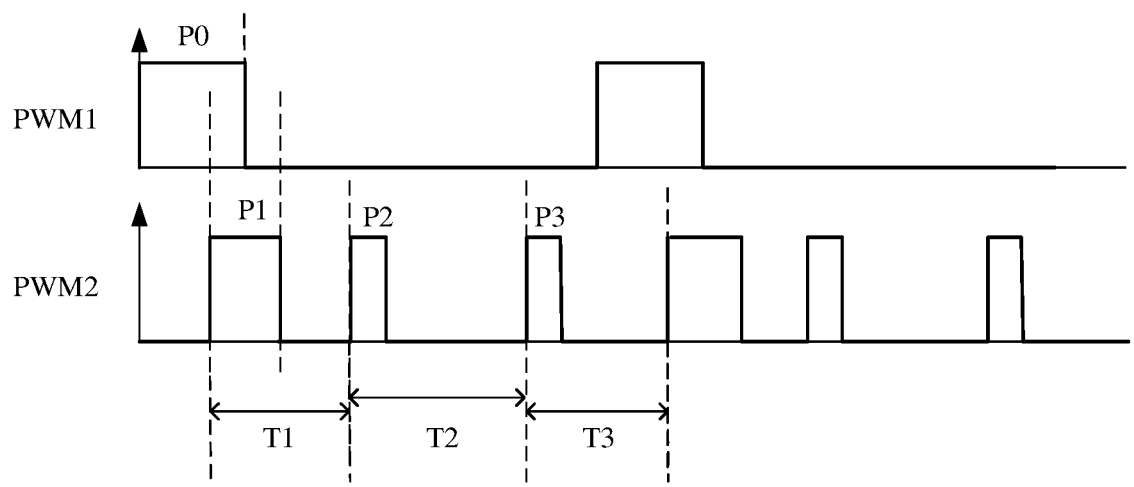
FIG. 4B is still another waveform graph of driving signals according to an embodiment.

FIG. 4B is still another waveform graph of driving signals according to an embodiment. P1, P2, and P3 represent three pulses of the second driving signal in one period of the first driving signal, and P0 represents the pulse of the first driving signal in one period. Period T1 corresponding to P1 may be the same as period T3 corresponding to P3, that is, T1=T3, and therefore, a frequency corresponding to P1 may be equal to a frequency corresponding to P3. However, the periods of P1 and P3 are different from period T2 corresponding to P2, and therefore, the frequencies of P1 and P3 are different from a frequency corresponding to P2. T3 may be greater than T2.

In addition, pulse P0 of the first driving signal overlaps with the first pulse P1 of the three pulses of the second driving signal. In a time period in which pulse P0 and pulse P1 overlap, the inductor is charged, and discharged until pulse P1 is at a low level.

Two pulses, namely, P2 and P3, still exist in a low-level time period in one period of the first driving signal. By configuring asymmetric driving signals shown in FIG. 4B, the controller can still increase a charge and discharge frequency of the inductor, and further reduce a ripple current of the inductor.

Figure 4C:
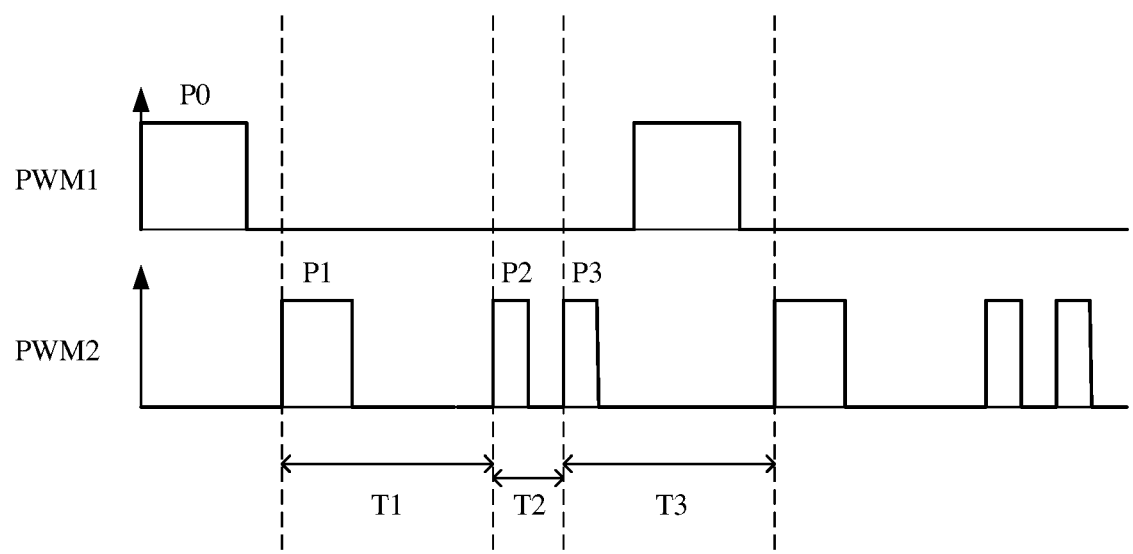
FIG. 4C is yet another waveform graph of driving signals according to an embodiment.

In another situation, pulse widths of P1, P2, and P3 may be different or partially the same. For example, P2=P3, and P1 is not equal to P3. FIG. 4C is yet another waveform graph of driving signals according to an embodiment.

In FIG. 4C, features of periods and frequencies corresponding to P1, P2, and P3 are the same as those in FIG. 4A, with differences from FIG. 4A as follows: In the waveform graph of driving signals shown in FIG. 4C, a pulse width of P1 is different from a pulse width of P2, and the pulse width of P1 is different from a pulse width of P3, but the pulse width of P2 is the same as the pulse width of P3.

A difference of FIG. 4C from FIG. 4B lies in that, there is a delay time between a rising edge of the first pulse of the second driving signal and a falling edge of the pulse of the first driving signal, which will be described in detail in subsequent embodiments.

The controller increases the quantity of pulses of PWM2 in the low-level time period of PWM1 to increase a quantity of charging and discharging times of the inductor, and further increase a charge and discharge frequency of the inductor. Therefore, even if the pulse widths of the pulses of PWM2 are different, the ripple current of the inductor can also be reduced.

In a second case, frequencies corresponding to the N pulses are different.

For ease of understanding, the following describes in detail an implementation form of the driving signal by using an example in which the second driving signal has three pulses in a low-level time period of each period of the first driving signal. In other words, when N=3, frequencies corresponding to the three pulses are different.

Figure 5A:
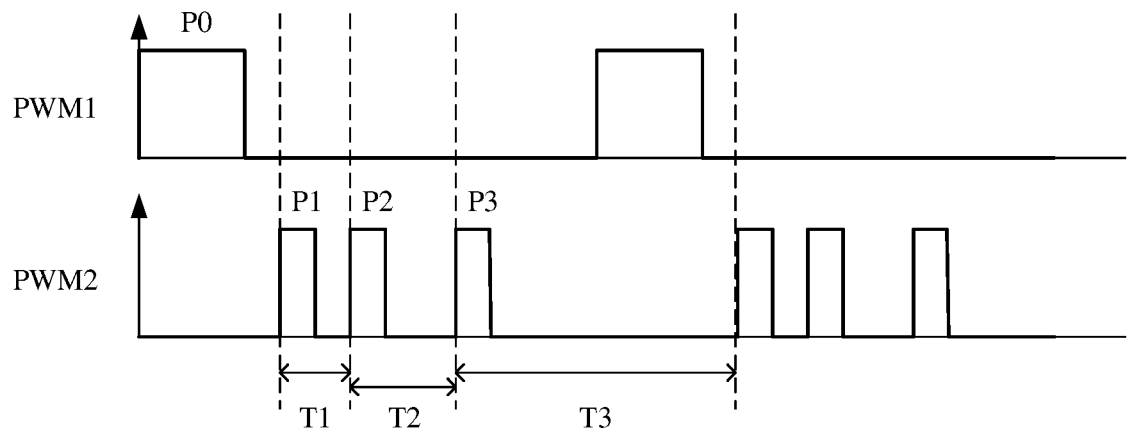
FIG. 5A is still yet another waveform graph of driving signals according to an embodiment.

FIG. 5A is still yet another waveform graph of driving signals according to an embodiment.

P1, P2, and P3 correspond to three pulses of the second driving signal existing in a low-level time period in one period of the first driving signal.

T1 is a period corresponding to P1, T2 is a period corresponding to P2, and T3 is a period corresponding to P3.

Period T3 corresponding to P3 may be greater than period T2 corresponding to P2 and period T2 corresponding to P2 may be greater than period T1 corresponding to P1, that is, T3>T2>T1. Therefore, P1, P2, and P3 may correspond to different frequencies.

Pulse widths of the three pulses are not limited in this embodiment. For example, the pulse widths of P1, P2, and P3 are the same. In another case, the pulse widths of P1, P2, and P3 may be partially the same, or may be different.

Figure 5B:
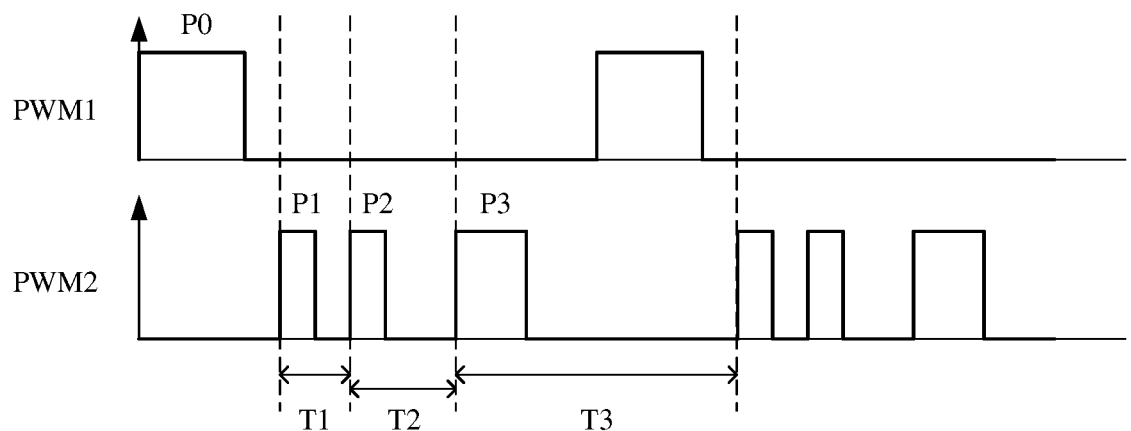
FIG. 5B is a waveform graph of driving signals according to an embodiment.

FIG. 5B is a waveform graph of driving signals according to an embodiment.

In FIG. 5B, features of periods and frequencies corresponding to P1, P2, and P3 are the same as those in FIG. 5A, with differences from FIG. 5A as follows: In the waveform graph of driving signals shown in FIG. 5B, a pulse width of P3 is different from a pulse width of P1, and the pulse width of P3 is different from a pulse width of P2, but the pulse width of P1 is the same as the pulse width of P2.

The controller increases the quantity of pulses of PWM2 in the low-level time period of PWM1 to increase the quantity of charging and discharging times of the inductor, and further increase the charge and discharge frequency of the inductor. Therefore, even if the pulse widths of the pulses of PWM2 are different, the ripple current of the inductor can also be reduced.

The first and second cases described above are described only by using an example in which N is equal to 3. N may alternatively be an integer greater than 3, for example, 4 or 5.

When N is equal to 2, the first and second cases may be combined. In other words, when N is equal to 2, PWM2 has two pulses in each period of PWM1. For the first case in which frequencies corresponding to at least two pulses in the two pulses are different, frequencies corresponding to the two pulses are different. For the second case in which frequencies corresponding to the two pulses are different, frequencies corresponding to the two pulses are different.

Figure 5C:
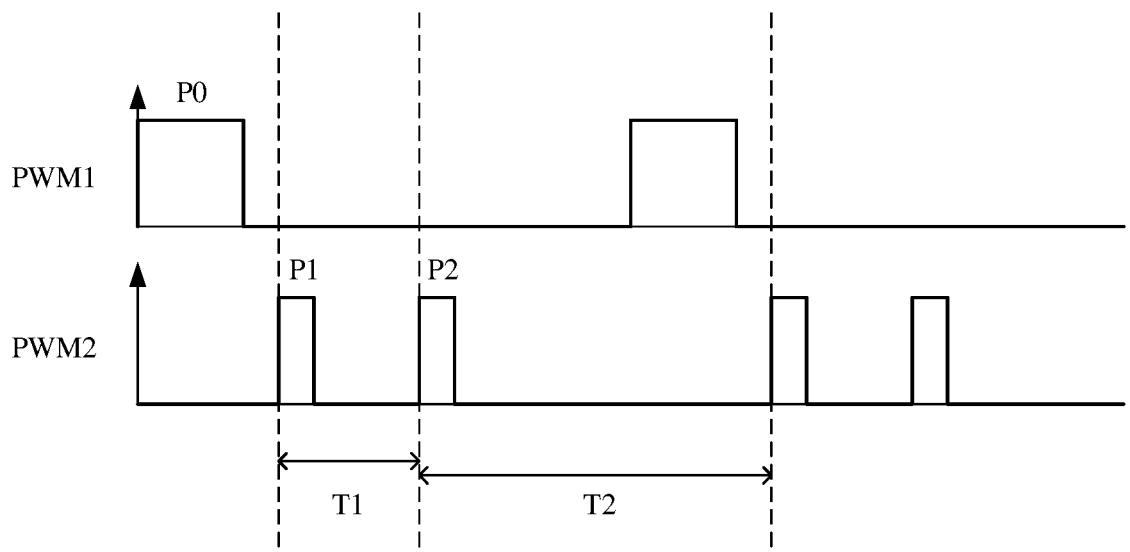
FIG. 5C is another waveform graph of driving signals according to an embodiment.

When N=2, the foregoing first and second cases may be combined into one form of driving signal. FIG. 5C is another waveform graph of driving signals according to an embodiment.

P1 and P2 represent two pulses of PWM2 in each period of PWM1.

T1 is a period corresponding to P1, and T2 is a period corresponding to P2.

Period T2 corresponding to P2 may be greater than period T1 corresponding to P1, that is, T2>T1. Therefore, P1 and P2 correspond to different frequencies.

A third case is described below. The third case is applicable to a situation that N is greater than 2.

In a third case, frequencies of the first N−1 pulses in the N pulses are the same, and a frequency of the last pulse of the N pulses is less than the frequency of the first N−1 pulses.

For ease of understanding, the following describes in detail an implementation form of the driving signal by using an example in which the second driving signal has three pulses in a low-level time period of each period of the first driving signal. In other words, when N=3, frequencies corresponding to the first two pulses in the three pulses are the same, and a frequency corresponding to the last pulse is less than the frequency corresponding to the first two pulses.

Figure 6A:
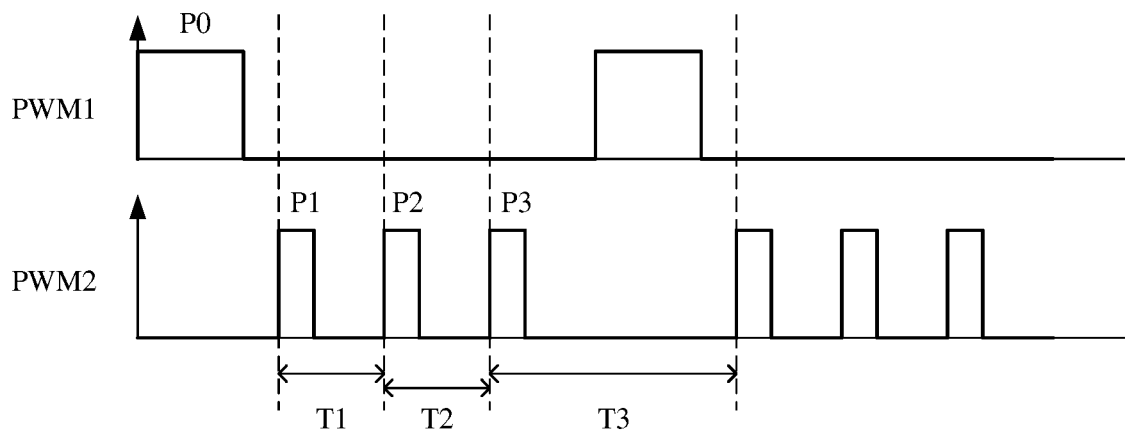
FIG. 6A is still another waveform graph of driving signals according to an embodiment.

FIG. 6A is still another waveform graph of driving signals according to an embodiment.

P1, P2, and P3 correspond to three pulses of the second driving signal existing in a low-level time period in one period of the first driving signal.

T1 is a period corresponding to P1, T2 is a period corresponding to P2, and T3 is a period corresponding to P3.

Period T3 corresponding to P3 may be greater than period T2 corresponding to P2, period T3 corresponding to P3 may be greater than period T1 corresponding to P1, and period T1 corresponding to P1 may be equal to period T2 corresponding to P2, that is, T3>T2=T1. Therefore, P1 and P2 correspond to a same frequency, and a frequency corresponding to P3 is less than the frequency corresponding to P1 and P2.

Figure 6B:
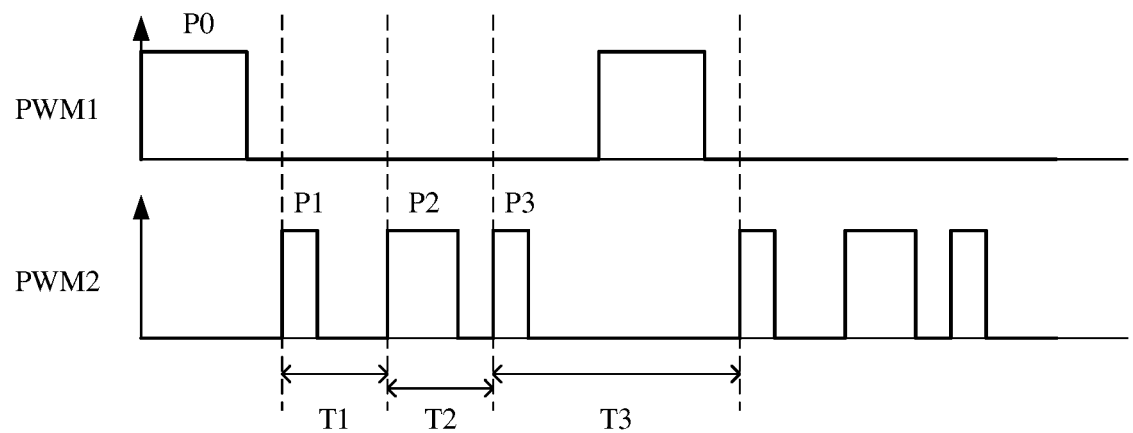
FIG. 6B is yet another waveform graph of driving signals according to an embodiment.

Pulse widths of P1, P2, and P3 are all the same. In another case, the pulse widths of P1, P2, and P3 may be different. FIG. 6B is yet another waveform graph of driving signals according to an embodiment.

In FIG. 6B, features of periods and frequencies corresponding to P1, P2, and P3 are the same as those in FIG. 6A, with differences from FIG. 6A as follows: In the waveform graph of driving signals shown in FIG. 6B, a pulse width of P2 is different from a pulse width of P1, and the pulse width of P2 is different from a pulse width of P3.

The controller increases the quantity of pulses of PWM2 in the low-level time period of PWM1 to increase the quantity of charging and discharging times of the inductor, and further increase the charge and discharge frequency of the inductor. Therefore, even if the pulse widths of the pulses of PWM2 are different, the ripple current of the inductor can also be reduced.

In addition, if N is equal to 4, the third case will be that, frequencies corresponding to the first three pulses in the four pulses are the same, and a frequency corresponding to the last pulse is less than the frequency corresponding to the first three pulses. If N is an integer greater than 3, the third case will be that, frequencies corresponding to the first N−1 pulses in the N pulses are the same, and a frequency corresponding to the last pulse is less than the frequency corresponding to the first N−1 pulses.

For ease of description, the following describes a waveform graph of driving signals after a change of the third case by using an example in which N is equal to 4.

Figure 6C:
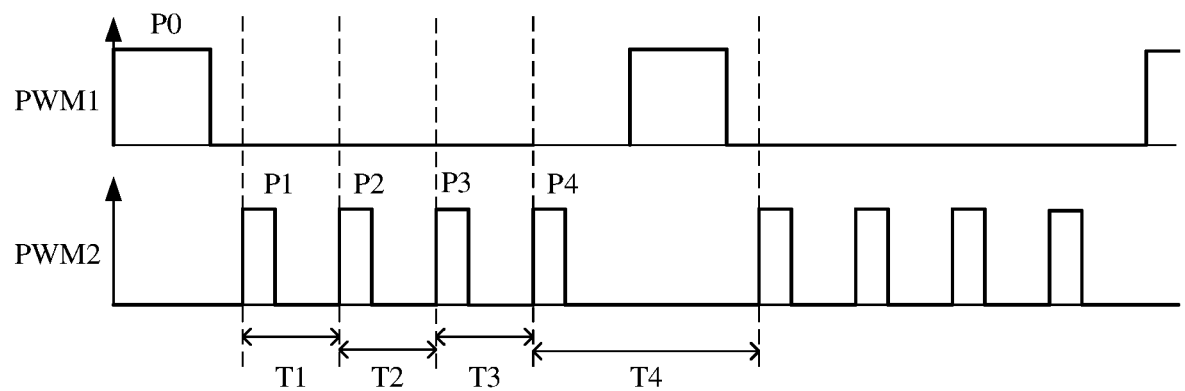
FIG. 6C is still yet another waveform graph of driving signals according to an embodiment.

FIG. 6C is still yet another waveform graph of driving signals according to an embodiment.

P1, P2, P3, and P4 correspond to four pulses of PWM2 in each period of PWM1.

T1 is a period corresponding to P1, T2 is a period corresponding to P2, T3 is a period corresponding to P3, and T4 is a period corresponding to P4.

Periods of the first three pulses may be the same and a period of the last pulse may be greater than the period of the first three pulses. In other words, T1 is equal to T2 and T3, and T1, T2, and T3 are all less than T4, that is, T1=T2=T3<T4. Therefore, frequencies corresponding to P1, P2, and P3 are the same, and a frequency corresponding to P4 is less than the frequency corresponding to P1, P2, and P3.

Through implementation forms of the driving signals, the controller can increase the charge and discharge frequency of the inductor in each period of the first driving signal, and further reduce the ripple current of the inductor.

In each period of the first driving signal, a rising edge of the first pulse of the N pulses follows a falling edge of the first driving signal. The following describes in detail a manner of obtaining a time lag between the rising edge of the first pulse of the N pulses and a rising edge of a pulse of the first driving signal.

Embodiment 3 of Converter

For ease of understanding by a person skilled in the art, the following describes in detail the time lag by using an example in which frequencies corresponding to the first N−1 pulses of the N pulses of the second driving signal are the same, and a frequency of the last pulse is less than the frequency of the first N−1 pulses.

Figure 7:
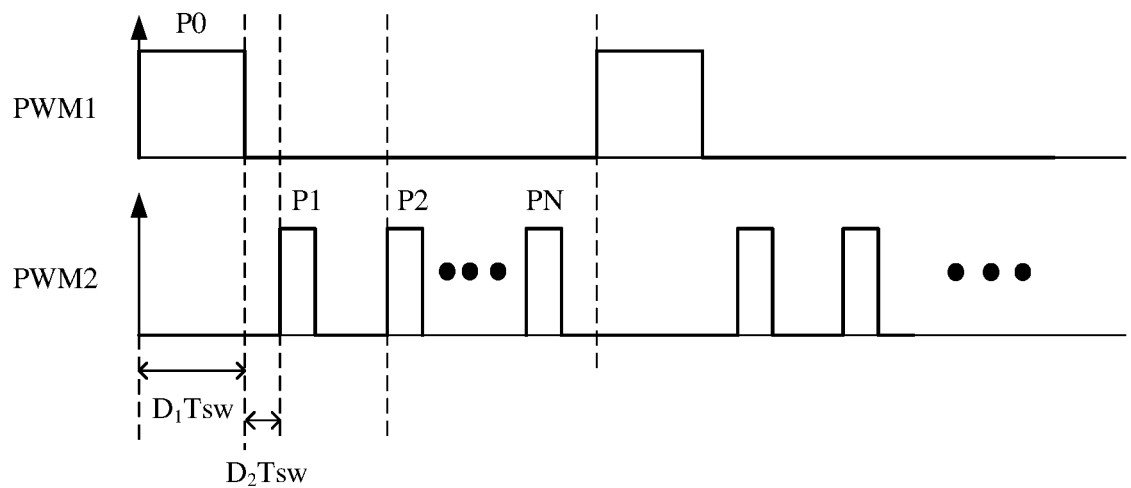
FIG. 7 is a further waveform graph of driving signals according to an embodiment.

FIG. 7 is a further waveform graph of driving signals according to an embodiment.

In one period of PWM1, P1 represents the first pulse of PWM2, P2 represents the second pulse of PWM2, PN represents the $N^{th}$ pulse of PWM2, and P0 represents a pulse of PWM1.

$D_1$ Tsw is high-level duration of PWM1, $D_2$ Tsw is a time that a rising edge of P1 lags behind a falling edge of P0, and $(D_1+D_2)$Tsw is a time lag between the first pulse of the N pulses of the second driving signal and a first driving signal.

In an actual operation process, different influence factors can be selected to determine $(D_1+D_2)$Tsw for different requirements. The following provides descriptions in three cases.

In a first case, in each period of the first driving signal, the time lag $(D_1+D_2)Tsw$ between the first pulse of the N pulses and the first driving signal is determined based on a ripple current of an inductor.

Because the ripple current of the inductor is affected by $(D_1+D_2)Tsw$, the controller may determine $(D_1+D_2)Tsw$ through the ripple current of the inductor.

To further reduce the ripple current of the inductor and keep the ripple current of the inductor at a low value, the controller controls a charge current of the inductor to be equal to a discharge current of the inductor in each charge and discharge period of the inductor, so as to determine $(D_1+D_2)Tsw$. After determining $(D_1+D_2)Tsw$, the controller may obtain a ripple current with a small value based on $(D_1+D_2)Tsw$.

The following describes in detail, with reference to the topology diagram of the converter shown in FIG. 1, a process in which the controller obtains the time lag $(D1+D2)Tsw$.

The controller determines the time lag based on an input voltage $V_{in}$ of the converter, an output voltage $V_o$, a voltage $V_c$ of a flying capacitor $C_{fly}$, and the period $T_{sw}$ of the first driving signal.

With reference to FIG. 2, using an example in which the controller sends the first driving signal to a first switching transistor and sends a second driving signal to a second switching transistor, period a and period b correspond to one charge and discharge period of the inductor. In this case, period a corresponds to T1 switched on, and period b corresponds to T1 switched off. The inductor satisfies the following equation in the charge and discharge period:

$$(V_{in}+V_c-v_o)D_1T_{sw}=(V_o-V_{in})D_2T_{sw}$$

where $V_{in}$ is the input voltage of the converter, $V_o$ is the output voltage of the converter, $V_c$ is the voltage of the flying capacitor, $T_{sw}$ is the period of the first driving signal, $D_1$ is a duty cycle of the converter, and $D_2 T_{sw}$ is the delay time between the rising edge of the first pulse of the N pulses and the falling edge of the first driving signal.

The duty cycle $D_1$ of the converter satisfies the following equation:

$$D_1 = 1 - \frac{V_{in}}{V_o}$$

where $D_1$ is the duty cycle of the converter, $V_{in}$ is the input voltage of the converter, and $V_o$ is the output voltage of the converter.

Therefore, the controller may obtain the time lag $(D_1+D_2)Tsw$ according to the foregoing two equations, and further reduce the ripple current of the inductor.

In a second case, in each period of the first driving signal, the time lag between the first pulse of the N pulses and the first driving signal is determined based on a loss of the first switching transistor and/or a loss of the second switching transistor.

To further reduce a loss generated in a circuit, $(D_1+D_2)Tsw$ may be determined based only on the loss of the first switching transistor, or may be determined based only on the loss of the second switching transistor, or may be determined based on both the loss of the first switching transistor and the loss of the second switching transistor.

For example, when the controller determines $(D_1+D_2)Tsw$ based only on the loss of the first switching transistor, $(D_1+D_2)Tsw$ corresponding to a smallest loss of the first switching transistor is determined; when the controller determines $(D_1+D_2)Tsw$ based only on the loss of the second switching transistor, $(D_1+D_2)Tsw$ corresponding to a smallest loss of the second switching transistor is determined; and when the controller determines $(D_1+D_2)Tsw$ based on both the loss of the first switching transistor and the loss of the second switching transistor, $(D_1+D_2)Tsw$ corresponding to a moment when the loss of the first switching transistor and the loss of the second switching transistor are evenly distributed is determined.

Therefore, the controller may determine $(D_1+D_2)Tsw$ based on the loss of the switching transistor, thereby reducing the loss generated in the circuit and improving conversion efficiency of the converter.

In a third case, in each period of the first driving signal, the time lag between the first pulse of the N pulses and the first driving signal is determined based on the ripple current of the inductor and a loss of at least one switching transistor.

To reduce both the ripple current of the inductor and the loss generated in the circuit, the controller may determine $(D_1+D_2)Tsw$ based on a combination of the influence factors introduced in the first and second cases.

Therefore, the controller can obtain $(D_1+D_2)Tsw$ corresponding to a low ripple current of the inductor and a low loss of at least one switching transistor.

The foregoing embodiments describe a method for controlling a driving signal. The method for controlling a driving signal is also applicable to a modification of the topology diagram of the converter shown in FIG. 1. The modified topology diagram is described in detail below.

Embodiment 4 of Converter

The topology diagram of the converter is not limited, and a person skilled in the art may perform adaptive modification on the topology diagram based on an actual requirement.

Figure 8:
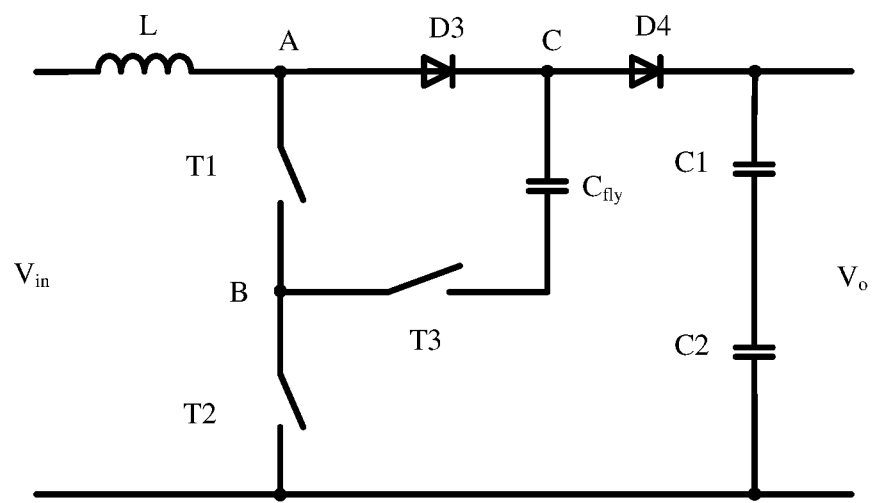
FIG. 8 is another topology diagram of a three-level boost converter according to an embodiment.

FIG. 8 is another topology diagram of a three-level boost converter according to an embodiment.

On the basis of the topology diagram shown in FIG. 1, the converter further includes a fifth switching transistor T3.

A first terminal of the fifth switching transistor T3 is connected to the second node B, and a second terminal of the fifth switching transistor T3 is connected to the first terminal of the flying capacitor $C_{fly}$.

By sending asymmetric driving signals to the first switching transistor T1 and the second switching transistor T2, the controller can also increase a charge and discharge frequency of the inductor L, and therefore reduce a ripple current of the inductor L.

A circuit shown in FIG. 8 has the following advantages over the circuit shown in FIG. 1:

When a power supply is turned on, T3 is first controlled to be switched off, so that L, D$_3$, C$_{fly}$, and T2 cannot form a loop for a current to pass through. In this case, a voltage Vin of the power supply is not applied to T2, and therefore, T2 is protected. For example, when Vin is 1400 V, switching transistors with a withstand voltage of 950 V are usually used for T1 and T2. If T3 is not added, a voltage on the flying capacitor $C_{fly}$ is 0 at a moment when the power supply is turned on. In other words, Vin is almost completely applied to T2. This causes T2 to withstand a voltage that exceeds a voltage stress of the component, which could damage T2.

FIG. 9 is still another topology diagram of a three-level boost converter according to an embodiment.

On the basis of the topology shown in FIG. 1, the converter further includes a third diode $D_5$, and a fourth diode $D_6$.

An anode of the third diode $D_5$ is connected to a midpoint of an output voltage of the three-level boost converter, that is, the anode of the third diode $D_5$ is connected to a first terminal of a first capacitor C1, the first terminal of the first capacitor C1 is connected to a first terminal of a second capacitor C2, a second terminal of the first capacitor C1 is connected to a first output, and a second terminal of the second capacitor C2 is connected to a second output.

A cathode of the third diode $D_5$ is connected to the third node C. A function of $D_5$ is to clamp a pressure drop withstood by $D_4$ to prevent $D_4$ from withstanding an entire direct current bus voltage (Vo) when T2 is switched on.

An anode of the fourth diode $D_6$ is connected to the second node B, and a cathode of the fourth diode $D_6$ is connected to the midpoint of the output voltage, that is, the cathode of the fourth diode $D_6$ is connected to the first terminal of the first capacitor C1.

By sending asymmetric driving signals to the first switching transistor T1 and the second switching transistor T2, the controller can also increase the charge and discharge frequency of the inductor L, and therefore reduce the ripple current of the inductor L.

A function of FIG. 9 is consistent with a function of FIG. 8, both to reduce a voltage stress withstood by T2 when the power supply is turned on, that is, when the power supply is connected. A circuit shown in FIG. 9 has the following advantages over the circuit shown in FIG. 1:

D5 and D6 are added in FIG. 9 so that when the power supply is turned on, $C_{fly}$ and C1 are connected in parallel, Vin charges $C_{fly}$, and $C_{fly}$ does not have a voltage of 0. Therefore, the voltage Vin of the power supply is not completely applied to T2, which reduces the voltage stress withstood by T2, thereby protecting T2.

$D_3$ and $D_4$ in FIG. 8 and FIG. 9 may both be replaced with switching transistors, that is, respectively replaced with a third switching transistor and a fourth switching transistor, provided that both the third switching transistor and the fourth switching transistor are controlled to implement operating modes of the diodes.

Method Embodiment 1

The converter is described in the foregoing embodiments, and a control method for a converter is described in detail below.

FIG. 10 is a flowchart of a control method for a three-level boost converter according to an embodiment.

For a topology diagram of the converter, described in the foregoing embodiments, to which the method is applied, refer to FIG. 1. Details are not described herein again.

The method includes the following steps.

Step 1001: When a voltage of a flying capacitor is less than or equal to a half of a bus voltage, send a first driving signal to a first switching transistor, and send a second driving signal to a second switching transistor.

The bus voltage is an output voltage of the three-level boost converter. The second driving signal has N pulses in each period of the first driving signal, an inductor has N+1 charge and discharge periods in each period of the first driving signal, and N is an integer greater than or equal to 2.

Therefore, the inductor has at least three charge and discharge periods in each period of the first driving signal, thereby increasing a charge and discharge frequency of the inductor in each period of the first driving signal.

A value of N is not limited and N is an integer greater than or equal to 2. For example, N may be 2 or 3, or may be an integer with a larger value. For ease of description, an example that N is equal to 2 is used below for detailed description.

With reference to FIG. 2, PWM2 has a plurality of periods in each period of PWM1, and PWM2 has two pulses in a low-level time period in each period of PWM1. Therefore, the inductor has three charge and discharge periods in one period of PWM1, that is, the inductor completes three times of charging and discharging in one period of PWM1. In other words, the charge and discharge frequency of the inductor is increased.

Step 1002: When the voltage of the flying capacitor is greater than the half of the bus voltage, send a first driving signal to the second switching transistor, and send a second driving signal to the first switching transistor.

Similarly, when the voltage of the flying capacitor is greater than the half of the bus voltage, the charge and discharge frequency of the inductor in each period of PWM1 can also be increased. Compared with the first case that the voltage of the flying capacitor is less than or equal to the half of the bus voltage, in which the inductor performs at least two times of charging and discharging when the first switching transistor is in an off state, in the second case, the inductor performs at least two times of charging and discharging when the second switching transistor is in an off state.

Therefore, based on a magnitude relationship between the voltage of the flying capacitor and the half of the bus voltage, asymmetric driving signals are sent to the first switching transistor and the second switching transistor in the method, to increase the charge and discharge frequency of the inductor. In both the first case and the second case, a controller can send the asymmetric driving signals to the first switching transistor and the second switching transistor, to increase the charge and discharge frequency of the inductor, and further reduce a ripple current of the inductor, so that an inductor with a small inductance can be selected.

It is assumed that a rising edge of the first pulse of the second driving signal lags behind a falling edge of a pulse of the first driving signal, and the second driving signal has N pulses in a low-level time period of each period of the first driving signal, where N is greater than or equal to 2. With reference to FIG. 2, an example in which N is equal to 2 is used for description. PWM1 and PWM2 are asymmetric driving signals. In one period of PWM1, PWM1 has one pulse, PWM2 has two pulses, and the inductor performs three times of charging and discharging. The method can increase the charge and discharge frequency of the inductor and reduce the ripple current of the inductor.

The control method for a converter is described above, and several implementation forms of the driving signal are described in detail below.

Because the first driving signal is simple, an implementation of the corresponding second driving signal in one period of the first driving signal is described below.

Frequencies corresponding to at least two pulses of the N pulses of the second driving signal are different.

For ease of understanding, the following provides descriptions by using an example in which the second driving signal has three pulses in the low-level time period of each period of the first driving signal. In other words, when N=3, frequencies corresponding to two pulses of the three pulses are different.

As shown in FIG. 4A, period T1 corresponding to P1 may be the same as period T3 corresponding to P3, that is, T1=T3, and therefore, a frequency corresponding to P1 may be equal to a frequency corresponding to P3. However, the periods of P1 and P3 are different from period T2 corresponding to P2, and therefore, the frequencies of P1 and P3 are different from a frequency corresponding to P2. T3 may be greater than T2.

In another case, with reference to FIG. 4B, features of frequencies of the pulses are the same as features of frequencies of the pulses in FIG. 4A, with differences from FIG. 4A as follows: The first pulse of the second driving signal overlaps with the pulse of the first driving signal in terms of time, for example, pulse P0 of the first driving signal overlaps with the first pulse P1 of the three pulses of the second driving signal. In a time period in which pulse P0 overlaps with pulse P1, the inductor is charged, and discharged until pulse P1 is at a low level.

Two pulses, namely, P2 and P3, still exist in the low-level time period in one period of the first driving signal. Through the asymmetric driving signals shown in FIG. 4B, the charge and discharge frequency of the inductor can still be increased, and the ripple current of the inductor can further be reduced.

Comparison between FIG. 4A and FIG. 4B is further performed. In FIG. 4B, a pulse width of P1 is different from a pulse width of P2, the pulse width of P1 is different from a pulse width of P3, but the pulse width of P2 is the same as the pulse width of P3. In FIG. 4A, P1, P2, and P3 have a same pulse width.

Because of the increase of a quantity of pulses of PWM2 in the low-level time period of PWM1, a quantity of charging and discharging times of the inductor can be increased, and the charge and discharge frequency of the inductor is further increased. Therefore, even if the pulse widths of the pulses of PWM2 are different, the ripple current of the inductor can also be reduced.

It should be understood that, "at least one (piece)" means one or more, and "plurality" means two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions are merely embodiments and are not intended as limiting. Although the examples are described above, the embodiments are not intended to limit. By using the method disclosed above, any person of ordinary skill in the art can make a plurality of possible changes and modifications without departing from the scope of the of embodiments. Therefore, any simple amendment, equivalent change, or modification made to the foregoing embodiments shall fall within the scope of the embodiments.

What is claimed is:

1. A converter, comprising:
    a first switching transistor;
    a second switching transistor;
    an inductor;
    a flying capacitor; and
    a controller, wherein the first switching transistor and the second switching transistor are primary power transistors;
    when a voltage of the flying capacitor is less than or equal to a half of a bus voltage, the controller is configured to send a first driving signal to the first switching transistor, and send a second driving signal to the second switching transistor; or
    when a voltage of the flying capacitor is greater than a half of a bus voltage, the controller is configured to send a first driving signal to the second switching transistor, and sends a second driving signal to the first switching transistor, wherein the bus voltage is an output voltage of the three-level boost converter; and
    the second driving signal has N pulses in each period of the first driving signal, the inductor has N+1 charge and discharge periods in each period of the first driving signal, and N is an integer greater than or equal to 2.

2. The converter according to claim 1, further comprising:
    a third switching transistor; and
    a fourth switching transistor, wherein
    a first terminal of the inductor is connected to a first input of the three-level boost converter, a second terminal of the inductor is connected to a first node, a first terminal of the first switching transistor is connected to the first node, a second terminal of the first switching transistor is connected to a second node, a first terminal of the second switching transistor is connected to the second node, a second terminal of the second switching transistor is connected to a second input of the three-level boost converter, an anode and a cathode of the third switching transistor are respectively connected to the first node and a third node, an anode and a cathode of the fourth switching transistor are respectively connected to the third node and a first output of the three-level boost converter, a first terminal of the flying capacitor is connected to the second node, and a second terminal of the flying capacitor is connected to the third node.

3. The converter according to claim 2, wherein the second driving signal has N pulses in a low-level time period of each period of the first driving signal.

4. The converter according to claim 2, further comprising:
    a fifth switching transistor, wherein
    a first terminal of the fifth switching transistor is connected to the second node, and a second terminal of the fifth switching transistor is connected to the first terminal of the flying capacitor.

5. The converter according to claim 2, further comprising:
    a third diode; and
    a fourth diode, wherein
    an anode of the third diode is connected to a midpoint of the output voltage of the three-level boost converter, a cathode of the third diode is connected to the third node, an anode of the fourth diode is connected to the second node, and a cathode of the fourth diode is connected to the midpoint of the output voltage.

6. The converter according to claim 1, wherein frequencies corresponding to at least two pulses of the N pulses are different.

7. The converter according to claim 3, wherein the N pulses have a same pulse width.

8. The converter according to claim 6, wherein frequencies corresponding to all the N pulses are different.

9. The converter according to claim 1, wherein N is 2.

10. The converter according to claim 1, wherein N is greater than or equal to 3.

11. The converter according to claim 10, wherein frequencies of first N-1 pulses of the N pulses are the same, and a frequency of a last pulse of the N pulses is less than the frequency of the first N-1 pulses.

12. The converter according to claim 1, wherein in each period of the first driving signal, a rising edge of a first pulse of the N pulses follows a falling edge of the first driving signal.

13. The converter according to claim 12, wherein the controller is further configured to control a charge current of the inductor to be equal to a discharge current of the inductor in each charge and discharge period, to determine a time lag.

14. The converter according to claim 13, wherein the controller is further configured to determine the time lag based on an input voltage and the output voltage of the three-level boost converter, a voltage of the flying capacitor, and the period of the first driving signal.

15. The converter according to claim 14, wherein the controller is further configured to obtain the lag time, which is (D1+D2) Tsw, according to the following formula;

$$(V_{in}+V_c-V_o)D_1 T_{sw} = (V_o-V_{in})D_2 T_{sw}$$

wherein $V_{in}$ is the input voltage of the three-level boost converter, $V_o$ is the output voltage of the three-level boost converter, $V_c$ is the voltage of the flying capacitor, $T_{sw}$ is the period of the first driving signal, $D_1$ is a duty cycle of the three-level boost converter, and $D_2 T_{sw}$ is a delay time between the rising edge of the first pulse of the N pulses and the falling edge of the first driving signal.

16. The converter according to claim 12, wherein in each period of the first driving signal, a time lag between the first pulse of the N pulses and the first driving signal may be determined based on a loss of the first switching transistor and/or a loss of the second switching transistor.

17. The converter according to claim 12, wherein in each period of the first driving signal, a time lag between the first pulse of the N pulses and the first driving signal is determined based on a ripple current of the inductor and a loss of at least one switching transistor.

18. A control method for a three-level boost converter, wherein the three-level boost converter comprises a first switching transistor, a second switching transistor, an inductor, a flying capacitor, and a controller, and the first switching transistor and the second switching transistor are primary power transistors; and the method comprises:
when a voltage of the flying capacitor is less than or equal to a half of a bus voltage, sending a first driving signal to the first switching transistor, and sending a second driving signal to the second switching transistor; or
when a voltage of the flying capacitor is greater than a half of a bus voltage, sending a first driving signal to the second switching transistor, and sending a second driving signal to the first switching transistor, wherein
the bus voltage is an output voltage of the three-level boost converter; and
the second driving signal has N pulses in each period of the first driving signal, the inductor has N+1 charge and discharge periods in each period of the first driving signal, and N is an integer greater than or equal to 2.

19. The control method according to claim 18, wherein the second driving signal has N pulses in a low-level time period of each period of the first driving signal.

20. The control method according to claim 18, wherein frequencies corresponding to at least two pulses of the N pulses are different.

* * * * *